(12) United States Patent
Kelly

(10) Patent No.: US 7,387,763 B2
(45) Date of Patent: Jun. 17, 2008

(54) PREPARATION OF SHEET BY INJECTION MOLDING OF POWDER, CONSOLIDATION, AND HEAT TREATING

(75) Inventor: Thomas Joseph Kelly, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 182 days.

(21) Appl. No.: 11/207,922

(22) Filed: Aug. 19, 2005

(65) Prior Publication Data

US 2006/0039817 A1    Feb. 23, 2006

Related U.S. Application Data

(63) Continuation-in-part of application No. 10/900,803, filed on Jul. 27, 2004, now abandoned.

(51) Int. Cl.
*C21D 1/00* (2006.01)

(52) U.S. Cl. ............................. 419/29; 419/26; 419/48; 419/49

(58) Field of Classification Search .................. 419/28, 419/6, 40, 48, 29
See application file for complete search history.

(56) References Cited

U.S. PATENT DOCUMENTS

| 3,701,444 A | 10/1972 | Clement et al. |
| 3,839,026 A | 10/1974 | Harris et al. |
| 4,129,462 A | 12/1978 | Korenko |
| 4,213,026 A | 7/1980 | Duvall et al. |
| 4,426,428 A | 1/1984 | Kammer et al. |
| 4,624,706 A | 11/1986 | Badia |
| 4,673,123 A | 6/1987 | Shin et al. |
| 4,846,885 A | 7/1989 | Asphahani et al. |
| 5,051,112 A | 9/1991 | Keshavan et al. |
| 5,332,628 A | 7/1994 | Drossman |
| 5,427,736 A | 6/1995 | Ritter et al. |
| 5,682,665 A | 11/1997 | Svanberg |

(Continued)

FOREIGN PATENT DOCUMENTS

EP    0639540 A1    2/1995

(Continued)

OTHER PUBLICATIONS

Anonymous Internet Article, Nov. 2006, pp. 1-2, XP002408707, Retrieved from the Internet: URL:http://de.wikipedia.org/wiki/Spritzgie; (retrieved on Nov. 23, 2006).

(Continued)

*Primary Examiner*—Roy King
*Assistant Examiner*—Weiping Zhu
(74) *Attorney, Agent, or Firm*—McNees Wallace & Nurick LLC

(57) ABSTRACT

A sheet is prepared by mixing a mass of metallic powders with a temporary thermoplastic binder to form an injection-moldable mixture, thereafter injection molding the injection-moldable mixture to form a sheet precursor. The sheet precursor is consolidated to a relative density of substantially 100 percent to form the sheet, and thereafter heat treated. The final sheet is preferably a nickel-base superalloy having more than about 30 volume percent of gamma prime phase, or an intermetallic such as a titanium aluminide.

20 Claims, 2 Drawing Sheets

U.S. PATENT DOCUMENTS

| | | |
|---|---|---|
| 6,300,588 B1 | 10/2001 | Hughes et al. |
| 6,465,755 B2 | 10/2002 | Hughes et al. |
| 6,482,352 B1 | 11/2002 | Sakata et al. |
| 6,555,051 B1 | 4/2003 | Sakata et al. |
| 6,596,963 B2 | 7/2003 | Kelly |
| 6,750,430 B2 | 6/2004 | Kelly |
| 2002/0085941 A1 | 7/2002 | Deevi et al. |
| 2003/0041436 A1 | 3/2003 | Kelly et al. |
| 2003/0042233 A1 | 3/2003 | Kelly |
| 2003/0082066 A1 | 5/2003 | Hajaligol et al. |
| 2004/0013556 A1 | 1/2004 | Silvian et al. |
| 2004/0118245 A1 | 6/2004 | Ott et al. |

FOREIGN PATENT DOCUMENTS

| | | |
|---|---|---|
| GB | 1375438 A1 | 11/1974 |
| GB | 2080337 A1 | 2/1982 |
| WO | 03039792 A1 | 5/2003 |

OTHER PUBLICATIONS

R. Gerling et al., "Prospects for metal injection moulding using a gamma titanium aluminide based alloy powder", Materials Science and Engineering, No. A329-331, 2002, pp. 45-49, XP002408637, Germany.

A. Bose et al., "Powder Injection Molding Of Inconel 718 Alloy", Advances In Powder Metallurgy, Princeton, NJ, US, vol. 3, (Jun. 2, 1997), pp. 18-99, XP008059191.

John H. Moll, "Utilization of Gas-Atomized Titanium and Titanium-Aluminide Powder", JOM, May 2000, pp. 32-42, XP001247972.

R. Gerling et al., "Powder Production Techniques and PM Processing Routes For Gamma Titanium Aluminides", Gamma, Titanium, Aluminides, Proceedings of a Symposium, XX, XX, 2003, pp. 249-255, XP008068137.

PREPARATION OF SHEET BY INJECTION MOLDING OF POWDER, CONSOLIDATION, AND HEAT TREATING

This application is a continuation-in-part of application Ser. No. 10/900,803, filed Jul. 27, 2004, now abandoned, whose disclosure is incorporated by reference.

This application relates to the preparation of sheet material and, more particularly, to the preparation of low-ductility and other types of sheet material by injection molding.

BACKGROUND OF THE INVENTION

An aircraft skin is a thin sheet that covers all or a portion of the exterior of the aircraft. The aircraft skin is directly contacted by the air flow as the aircraft flies through the air, and is heated by the friction between the air flow and the skin material. For aircraft flying at relatively slow speeds, the frictional heating is not great, but with increasing aircraft speeds the maximum skin temperature is correspondingly increased. The material that forms the aircraft skin must have acceptable properties at the local maximum skin temperature, and the service temperature of the skin material is one of the potential limiting considerations in aircraft design.

Historically, aircraft skins have been made of aluminum alloys, which work well for aircraft flying at low speeds or higher speeds for short periods of time. More recently, some aircraft skins have been made of composite materials having better mechanical properties per unit weight than aluminum alloys at room temperature or slightly elevated temperatures. Aircraft skins have also been made of titanium alloys having service temperatures that are higher than those of aluminum alloys and composite materials, allowing the aircraft to operate at higher skin temperatures and thence higher sustained speeds than those having aluminum or composite aircraft skins.

Yet more-advanced aircraft have the potential for hypersonic flight wherein the aircraft skin, or portions thereof, are heated to even higher temperatures than permitted using the most advanced titanium-alloy aircraft skins now available. Alloys and intermetallic compounds are known that could be used to meet the aircraft skin requirements of these advanced aircraft, but these alloys and intermetallic compounds cannot be fabricated into the required sheet form using existing practices. Sheet material is normally made by melting the material, casting an ingot of the material, and then rolling the material to the form of the sheet. The metallic alloys and intermetallic compounds that could meet the property requirements for the sheet skins of the advanced aircraft do not exhibit the necessary ductility to permit them to be rolled into sheet form in a commercially viable operation. As a result, these low-ductility materials are not candidates for thin-sheet applications such as aircraft skins at this time.

There is accordingly a need for a combination of material and processing that permits the production of sheets suitable for aircraft skins that are subjected to the highest operating temperatures. The present invention fulfills this need, and further provides related advantages.

SUMMARY OF THE INVENTION

The present invention provides a fabrication approach by which existing or new low-ductility high-temperature materials may be fabricated into sheet form suitable for use as aircraft skins or in other applications. The present approach does not require the material ductility that is needed for sheet rolling. It therefore may be used to fabricate sheets of many different low-ductility metallic alloys and intermetallic compounds that are otherwise suitable for aircraft skins and other high-temperature sheet applications. Although the invention finds its greatest utility at the present time in relation to making sheet of such low-ductility metallic alloys and intermetallic compounds, its use is not so limited. It may be used to fabricate sheets of other materials such as higher-ductility metals, in cases where the use of powder starting material offers technical and/or economic advantages.

A method for preparing a sheet of a sheet composition comprises the steps of providing a mass of metallic powders, wherein the mass of metallic powders together have the sheet composition, mixing the metallic powders with a temporary thermoplastic binder to form an injection-moldable mixture, thereafter injection molding the injection-moldable mixture at an injection-molding temperature above the thermoplastic temperature of the thermoplastic binder to form an injection-molded sheet precursor, and thereafter removing excess thermoplastic binder from the injection-molded sheet precursor. The method further includes consolidating the injection-molded sheet precursor to a relative density of substantially 100 percent to form the sheet of the sheet composition, wherein the temporary thermoplastic binder is removed in the step of consolidating, and thereafter heat treating the sheet.

The mass of metallic powders is preferably provided as prealloyed powders, although elemental or other non-prealloyed powders may be used if the processing permits sufficient interdiffusion of the non-prealloyed powders.

The net metallic composition may be a nickel-base superalloy, preferably a nickel-base superalloy which is heat treated to produce more than about 30 volume percent, most preferably more than about 40 volume percent, gamma prime phase (including related phases such as alloy-modified gamma prime phase). The net metallic composition may instead be an intermetallic alloy, such as a titanium aluminide intermetallic alloy. A preferred titanium aluminide intermetallic alloy has a nominal sheet composition in atomic percent of from about 45 to about 49 percent aluminum and from about 48 to about 50.5 percent titanium, with the balance of other alloying and impurity elements such as chromium, niobium, tungsten, manganese, iron, nickel, tantalum, carbon, boron, and silicon. Other alloys may also be made by the present approach, which is most beneficially utilized when the ductility of the sheet material is relatively low but may also be used to fabricate sheets of higher-ductility materials. Whatever the sheet composition, there may be nonreactive nonmetallic particles mixed with the powders.

Most preferably, in the step of mixing, the metallic powders and the temporary thermoplastic binder are mixed at a mixing temperature above the thermoplastic temperature of the thermoplastic binder.

The injection molding is preferably accomplished by providing an injection-molding apparatus including an injection head with an injection nozzle defining the cross section of a sheet, and a movable receiver positioned to receive the injection-moldable mixture flowing from the injection nozzle. The injection-moldable mixture is loaded into the injection head, and the injection-moldable mixture is forced out of the injection nozzle onto the movable receiver. The movable receiver moves away from the injection nozzle at the same linear rate as the injection-moldable mixture is forced from the injection nozzle.

The step of consolidating may include sintering the injection-molded sheet precursor and/or hot isostatic pressing the injection-molded sheet precursor. Most preferably, the consolidating step includes sintering the injection-molded sheet precursor, and thereafter hot isostatic pressing the injection-molded sheet precursor.

The heat treatment is selected to be appropriate for the selected material. In the case of the preferred nickel-base superalloy, the metal alloy is solution treated and aged to produce the gamma prime phase that strengthens the material.

The sheet that is produced by the present approach preferably has a thickness of from about 0.030 inch to about 0.060 inch. The sheet preferably has a width dimension greater than about 50 times its thickness dimension, and a length dimension greater than 100 times its thickness dimension. The present approach may be used to make very large sheets, with a width dimension of 2 feet or more, and a length dimension of 4 feet or more. Sheet pieces of this size may be used as skin panels for aircraft. By comparison, conventional injection molding techniques are limited to pieces on the order of a few inches in maximum dimension.

The present approach produces the final sheet without the need for gross thermomechanical processing or gross metalworking in the usual sense of the roll-processing of sheet material. The sheet composition is provided as a powder, which is processed to the form of the sheet precursor. The sheet precursor is similar to the final sheet, but is thicker and has a lower relative density. There is a binder present that is removed in the subsequent processing. The sheet precursor is consolidated, preferably by sintering and hot isostatic pressing, to bond the powder particles together and increase the relative density to substantially 100 percent. "Substantially 100 percent" means that voids are present in an amount of no more than about 0.25 percent, more preferably no more than 0.1 percent, and most preferably zero. A sheet with a lower relative density would not have the required mechanical strength.

The present approach therefore results in the production of a sheet without requiring gross deformation of the material, which is not possible in the case of materials that have limited ductility. The present injection molding approach with subsequent consolidation and heat treatment is commercially viable, and may be used with both existing and future low-ductility alloys. It may also be used to make sheets of higher-ductility alloys, where technical considerations and/or process economics make it desirable to fabricate the sheets from powder starting materials. The sheet prepared by the present approach may be flat or curved. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
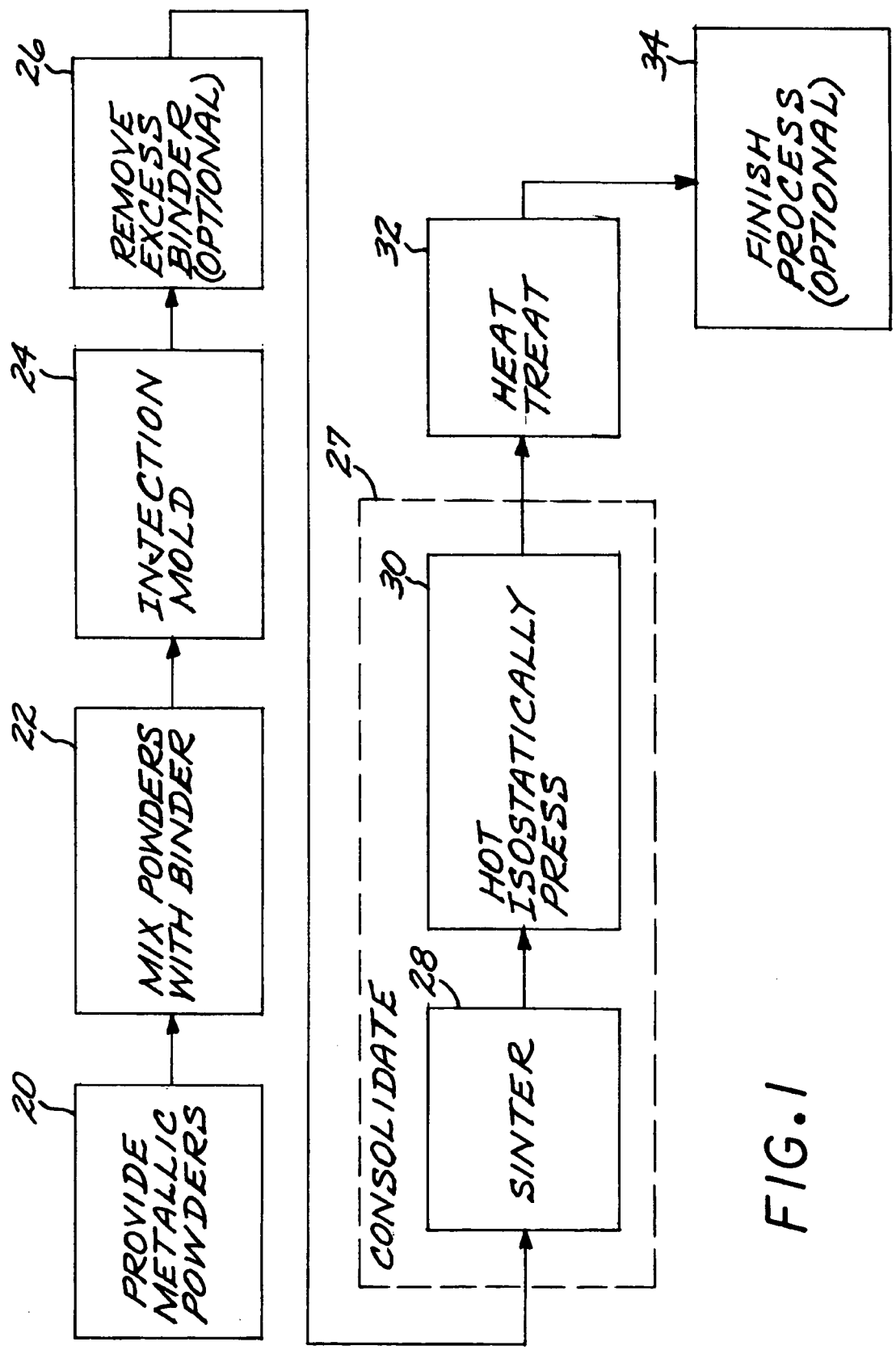
FIG. 1 is a block flow diagram of an approach for practicing an embodiment of the invention.

FIG. 1 depicts the steps in a method for preparing a sheet of a sheet composition. A mass of metallic powders is provided, step 20. The mass of metallic powders taken together have the sheet composition. The metallic powders are preferably prealloyed. That is, each powder particle has the net sheet composition as to metallic elements. Prealloyed metallic powders for compositions of interest are available commercially, or can be prepared specially by known techniques. The powder particles may instead be of different compositions, but selected so that the net composition of all of the powder particles taken together is the sheet composition of interest.

The present approach is operable to produce any of a wide range of sheet compositions. As long as prealloyed powders or powders who compositions can be combined to define a composition of interest are available, the present approach may be utilized. However, some sheet compositions are of particular interest, because they are difficult or impossible to produce by conventional metalworking techniques. One preferred sheet metal is a nickel-base superalloy that is heat treatable to produce more than about 30 volume percent gamma prime phase, more preferably more than about 40 volume percent gamma prime phase. Members of this class of materials work harden so rapidly and are of such limited ductility that it is difficult to produce them by rolling or other metalworking technique requiring gross deformation of the material to form the desired sheet form. Examples of such high-gamma prime nickel-base superalloys include Rene™ 77, having a nominal composition in weight percent of about 14.6 chromium, about 15.0 percent cobalt, about 4.2 percent molybdenum, about 4.3 percent aluminum, about 3.3 percent titanium, about 0.07 percent carbon, about 0.016 percent boron, about 0.04 percent zirconium, balance nickel and minor elements; Rene ™ 108, having a nominal composition in weight percent of about 9.5 percent cobalt, about 8.35 percent chromium, about 0.5 percent molybdenum, about 9.5 percent tungsten, about 3 percent tantalum, about 0.75 percent titanium, about 5.5 percent aluminum, about 1.5 percent hafnium, about 0.09 percent carbon, about 0.015 percent boron, about 0.01 percent zirconium, balance nickel and minor elements; Rene™ 142, having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements; and Rene™ N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements.

Another preferred sheet material is an intermetallic alloy such as a titanium-aluminum-base intermetallic alloy, which also has a high rate of work hardening and limited ductility, and therefore is difficult or impossible to roll into sheet by gross deformation processes. Titanium aluminide is an example. One such class of titanium aluminide sheets has a composition in atomic percent of from about 45 to about 49 percent aluminum and from about 48 to about 50.5 percent titanium, with the balance of other alloying and impurity elements such as chromium, niobium, tungsten, manganese, iron, nickel, tantalum, carbon, boron, and silicon.

Some other alloys of interest are difficult to manufacture as sheet because of their high work hardening rates that make them difficult to roll at room temperature. The conventional approach to sheet fabrication for these materials require multiple steps of rolling and annealing, so that the production cost is high. The present approach allows the production of such materials much more economically. Examples include Waspalloy, having a nominal composition in weight percent of 13.0 percent cobalt, 0.04 percent carbon, 1.5 percent aluminum, 3.0 percent titanium, 19.0 percent chromium, 4.3 percent molybdenum, balance nickel; Ti-64, having a nominal composition in weight percent of 6 percent aluminum, 4 percent vanadium, balance titanium; A286, having a nominal composition in weight percent of 24-27 percent nickel, 13.5-16 percent chromium, 1.9-2.35 percent titanium, 1.0-1.5 percent molybdenum, 0.1-0.5 percent vanadium, 0.08 percent maximum carbon, 2.0 percent maximum manganese, 1.0 percent maximum silicon, 0.35 percent maximum aluminum, 0.030 percent maximum sulfur, 0.001-0.01 percent boron, balance iron; and Alloy 718, having a nominal composition in weight percent of from about 50 to about 55 percent nickel, from about 17 to about 21 percent chromium, from about 4.75 to about 5.50 percent columbium plus tantalum, from about 2.8 to about 3.3 percent molybdenum, from about 0.65 to about 1.15 percent titanium, from about 0.20 to about 0.80 percent aluminum, 1.0 percent maximum cobalt, and balance iron totaling 100 percent by weight.

The present approach is not limited to the fabrication of sheets of difficult-to-work materials. Sheets of more-ductile and more-workable metallic and nonmetallic compositions may also be made by the present approach. There may be technical or economic reasons why it is preferred to fabricate sheets of such materials by the present approach, even though they may also be made by conventional rolling practice. For example, it may be technically or economically preferable to fabricate the sheets from powder starting material rather than cast starting material.

Optionally, nonreactive nonmetallic powders may be mixed with the metallic powders. The nonmetallic powders are typically hard intermetallic compounds such as carbides, borides, or the like that are present to strengthen the sheet, as by dispersion strengthening.

The powders are mixed with a thermoplastic binder to form an injection-moldable mixture, step 22. The thermoplastic binder is temporary in the sense that it is removed in a later step and is not present in the final sheet. The thermoplastic binder may be any operable thermoplastic binder suitable for sintering operations, preferably an organic or hydrocarbon thermoplastic binder. Examples include polyethylene, polypropylene, wax such as paraffin wax or carnuba wax, and polystyrene. A sufficient amount of the thermoplastic binder is used to render the mixture cohesive and pliable at temperatures above the thermoplastic temperature of the thermoplastic binder. The mixing of the powders and the binder is preferably performed at a mixing temperature that is above the thermoplastic temperature of the thermoplastic binder, which is typically 200° F. or greater but depends upon the specific thermoplastic binder material that is used. The thermoplastic binder material becomes flowable or "molten" at and above the thermoplastic temperature, which aids in the mixing. The mixing at this mixing temperature achieves a mixture that is flowable and injection moldable at or above the thermoplastic temperature, but which is relatively inflexible and hard below the thermoplastic temperature.

The injection-moldable mixture preferably does not contain any added water, although there may be a minor amount of water present as an impurity. A substantial amount of water, if present, may chemically react with the constituents of typical alloys of interest. The presence of a significant amount of water may also lead to centerline porosity after injection molding and sintering. Centerline porosity, if present, may be removed by subsequent consolidation where the alloy is malleable. However, the removal of the centerline porosity adds to the cost of the product, a cost that is avoided in the present approach. Additionally, such gross mechanical consolidation deformation processes cannot be readily used with many materials that may be made into sheet by the present approach due to their limited ductilities, such as intermetallic alloys and high-gamma-prime nickel-base superalloys. Hot isostatic pressing cannot generally be used to close internal porosity. Consequently, approaches that produce centerline porosity cannot be used to produce sheets of many of the materials of most interest. The combination of substantially no water and no added water, use of thermoplastic binder, and elevated-temperature injection molding of the present approach aids in avoiding the centerline porosity. Accordingly, it is preferred that the thermoplastic binder is substantially non-aqueous, water is not mixed with the injection-moldable mixture, and no water is used in the subsequent step of removal of excess thermoplastic binder.

The injection-moldable mixture of metallic powders and thermoplastic binder is thereafter injection molded to form an injection-molded sheet precursor, step 24. The injection molding step 24 is performed with the injection-moldable mixture at an injection-molding temperature above the thermoplastic temperature of the thermoplastic binder. The thermoplastic binder is therefore flowable, reducing the friction with the injection nozzle during the injection molding.

Figure 2:
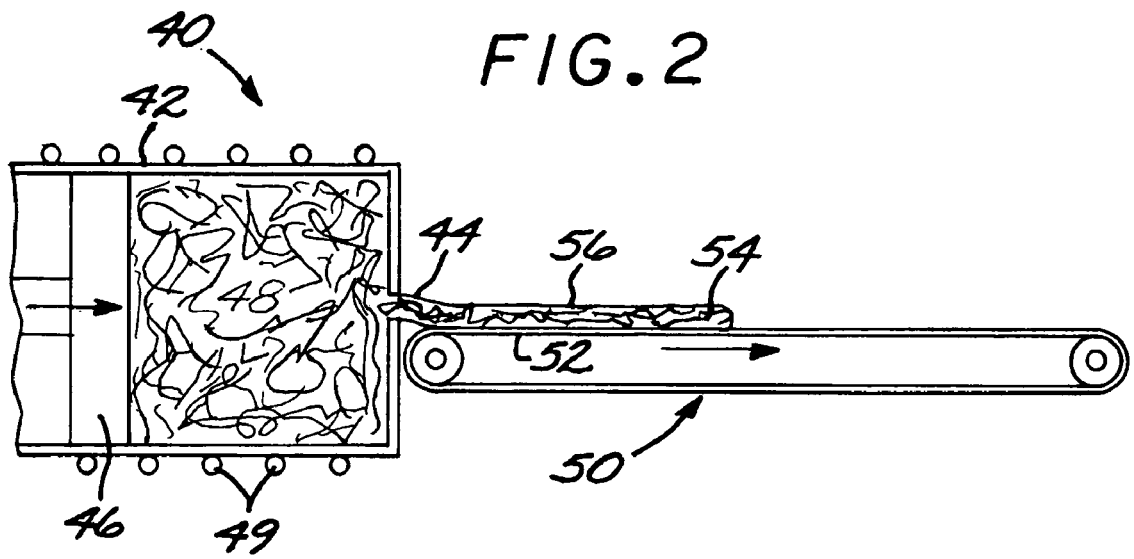
FIG. 2 is a schematic illustration of an injection-molding apparatus that may be used to practice the present approach.

Any type of operable injection-molding apparatus may be used to accomplish the injection molding step 24. A preferred type of injection-molding apparatus 40 is illustrated in FIG. 2. The injection-molding apparatus 40 includes an injection head 42 in the form of a chamber, with an injection nozzle 44 as the outlet of the chamber. A movable piston 46 forces the injection-moldable mixture 48 contained within the chamber of the injection head 42 through the injection nozzle 44. The injection head 42 includes a controllable heater 49 (represented as electrical resistance windings, but which may be of any operable type) that heats the injection-moldable mixture 48 to the injection-molding temperature. The injection nozzle 44 preferably has a cross-sectional shape that is elongated in the direction perpendicular to the plane of the illustration of FIG. 2 to define the cross-sectional shape of the sheet.

Preferably, no closed mold is used to receive and shape the injection-moldable mixture 48 as it flows from the injection nozzle 44. Because of the sheet shape that is being made, such a closed mold would have to be elongated. It would be difficult to injection mold into such an elongated hollow mold due to friction between the mold walls and the injection-moldable mixture. Instead, a movable receiver 50 is positioned to receive the sheet of the injection-moldable mixture 48 that flows from the injection nozzle 44. A receiving surface 52 of the movable receiver 48 moves away from the injection nozzle 44 at a linear rate that is adjusted to be the same as the linear rate at which the injection-moldable mixture 48 flows from the injection nozzle 44. This movement allows the injection-moldable mixture 48 to be smoothly and continuously deposited onto the moving receiving surface 52. The shape of the injection-moldable mixture 48 is maintained by the combination of this movement and the consistency of the mixture of the metal powders and the thermoplastic binder. In FIG. 2, the movable receiver 50 is depicted as a continuous conveyer, but it could be any other operable structure such as a movable plate-like surface.

To perform the injection molding step 24 using this preferred injection-molding apparatus 40, the injection-moldable mixture 48 is loaded into the interior chamber of the injection head 42. The piston 46 is moved to force the injection-moldable mixture 48 out of the injection nozzle 44 and onto the movable receiver 50. The receiving surface 52 of the movable receiver 50 moves away from the injection nozzle 44 at the same linear rate as the injection-moldable mixture 48 is forced from the injection nozzle 44, so that the injection-molded mixture is deposited upon the receiving surface 52 to form an injection-molded sheet precursor 54. The injection-moldable mixture 48 is above the thermoplastic temperature of the thermoplastic binder as it emerges from the injection nozzle 44. The injection-moldable mixture quickly cools so that by a point about 2 inches or so from the injection nozzle 44 the injection-moldable mixture 48 is below the thermoplastic temperature of the thermoplastic material and is therefore relatively rigid and hard. The resulting injection-molded sheet precursor 54 may therefore be picked up and handled with care.

Any excess thermoplastic binder in amounts greater than that required to bind the powder particles, if present, is thereafter optionally removed from the injection-molded sheet precursor 54 through its external surface 56, step 26. The excess thermoplastic binder is readily removed with a solvent for the excess thermoplastic binder. The solvent is contacted to the external surface 56 to dissolve the excess thermoplastic binder at the surface of the injection-molded sheet precursor 54 and below the surface as well. The solvent is selected according to the specific thermoplastic binder that is used. The solvent is preferably not aqueous in nature. Step 26 removes any excess binder, but leaves a sufficient amount of binder to bind the powder particles in the injection-molded sheet precursor 54 during the subsequent consolidation step. Removing the excess binder reduces the amount of binder that must be removed by vaporization or sublimation in the consolidation step.

Figure 3:
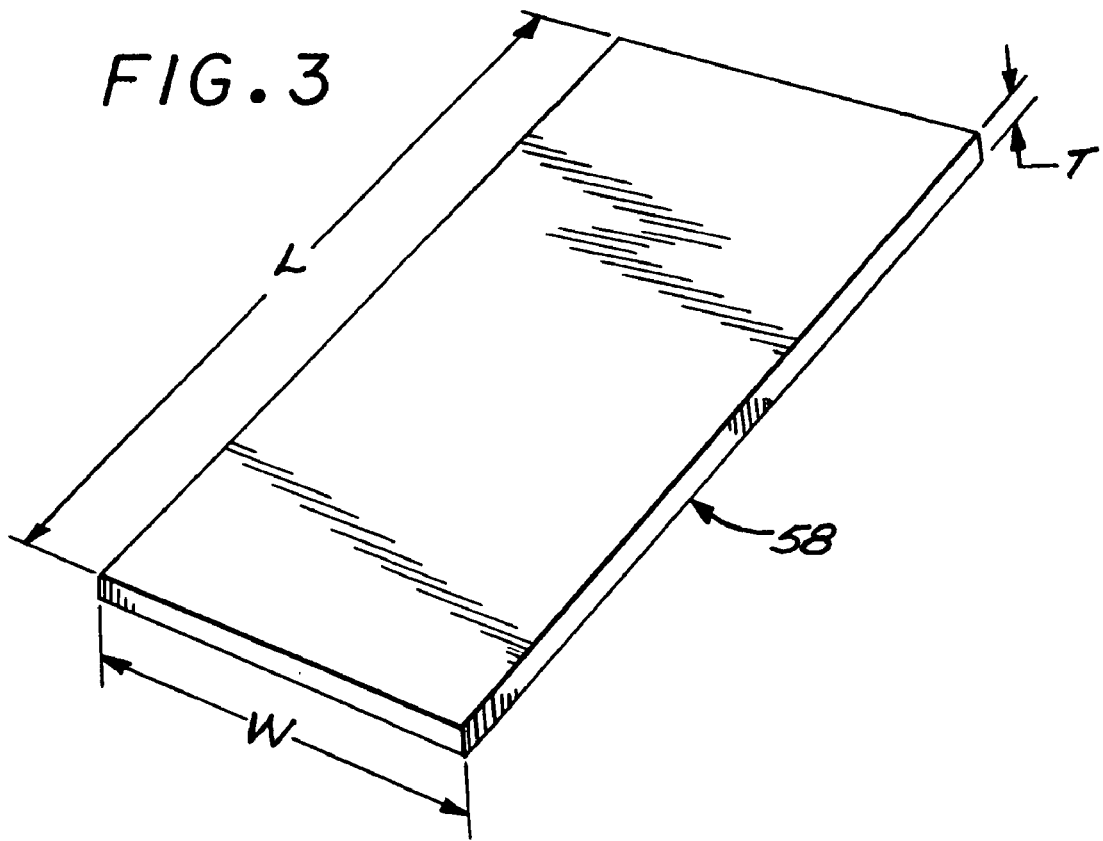
FIG. 3 is an perspective view of a sheet produced by the approach of FIG. 1 and using the apparatus of FIG. 2.

The injection-molded sheet precursor 54 is thereafter consolidated, step 27, to form a final sheet 58, illustrated in FIG. 3. The consolidation preferably includes sintering 28 and/or hot isostatic pressing, 30, and preferably both. The sintering 28 is preferably performed in a vacuum oven. As the temperature of the injection-molded sheet precursor 54 is increased, the remaining temporary thermoplastic binder is evaporated and removed, preferably leaving no trace chemicals that might later contaminate the final sheet article. The sintering 28 is preferably solid-state sintering and is thus below the melting point of the sheet composition.

The sintering step 28 typically sinters the sheet 58 to a relative density of not greater than 98 percent. The "relative density" is the percentage of the full density that is reached. For example, the weight of a sheet 58 of 98 percent relative density is 98 percent of the weight of a sheet of the same volume and same material, but of full density.

On the other hand, for most applications the sheet 58 must have a higher relative density in order to perform successfully. The higher relative density is preferably not achieved with further sintering, because the sintering times and temperatures become prohibitively large. Instead, to achieve a higher relative density the injection-molded sheet precursor 54 is preferably optionally further densified by a process such as hot isostatic pressing, step 30. Hot isostatic pressing at a temperature of greater than about 2100° F. for nickel-base superalloys or greater than about 2150° F. for titanium aluminides, at a pressure of from about 15,000 to about 25,000 pounds per square inch, and for a time of about 1-5 hours increases the relative density of the sheet 58 to substantially 100 percent. There may be a low level of voids present to the extent consistent with the strength requirements of the sheet, preferably no more than 0.25 percent voids, more preferably no more than 0.1 percent voids. A sheet with a lower relative density would not have the required mechanical strength.

Sintering 38 and hot isostatic pressing 30 are the preferred techniques for accomplishing the consolidation 27. However, other techniques that do not require gross deformation may be used in addition to or instead of sintering and hot isostatic pressing.

The final sheet 58 typically has a thickness dimension T of from about 0.030 inch to about 0.060 inch. There is no known absolute limitation on the thickness of the final sheet 58, although the ability to remove excess binder prior to consolidation may impose a practical limitation on the maximum thickness of the sheet. The thicker the sheet, the longer the time required to remove the excess binder. There is no known limitation on the width and length dimensions of the final sheet 58. The final sheet 58 also typically has a width dimension W at least 50 times the thickness dimension T, and a length dimension L at least 100 times the thickness dimension T. In some preferred applications, the width dimension W is at least about 2 feet, and the length dimension L is at least about 4 feet. Such large sheets are suitable for use as skin panels for aircraft airframes and engines. These large sheets may not be made using conventional closed-mold injection molding due to the friction of the flowing material with the mold walls, but may be made using the apparatus shown in FIG. 2. The injection-molded sheet precursor 54 is deliberately made oversize relative to the desired dimensions of the final sheet 58 to account for shrinkage that occurs in the consolidation 27. The necessary oversize may be calculated or determined from test pieces of the same material that are processed in the same way as the sheet 58.

The final sheet 58 may be used as is, or it may optionally be finish processed, step 34. Finish processing 34 may include, for example, processes such as cutting or machining, cleaning, and coating. It may also include shaping the sheet 58 to a shape other than what was initially produced by steps 20-32. The shaping may be accomplished by any operable approach, such as slow bending at elevated temperature. The order of the heat treating 32 and the finish processing 34 may be as illustrated, with finish processing 34 following heat treating 32. The order may be reversed, with finish processing 34 preceding heat treating 32, particularly where the finish processing 34 involves shaping the sheet 58, as by bending. The substep processing of the two steps 32 and 34 may be interspersed.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a sheet of a sheet composition, comprising the steps of
providing a mass of metallic powders, wherein the mass of metallic powders together have the sheet composition;
mixing the metallic powders with a temporary thermoplastic binder to form an injection-moldable mixture; thereafter
injection molding the injection-moldable mixture onto a moving surface of a movable receiver at an injection-molding temperature above the thermoplastic temperature of the thermoplastic binder to form an injection-molded sheet precursor having a width of at least about 2 feet and a length of at least about 4 feet; thereafter
consolidating the injection-molded sheet precursor to a relative density of substantially 100 percent to form the sheet of the sheet composition, wherein the temporary thermoplastic binder is removed in the step of consolidating; and thereafter
heat treating the sheet.

2. The method of claim 1, wherein the step of providing the mass of metallic powders includes the step of
providing the metallic powders as prealloyed metallic powders.

3. The method of claim 1, wherein the step of providing the mass of metallic powders includes the step of
providing the net metallic composition as a nickel-base superalloy.

4. The method of claim 1, wherein the step of providing the mass of metallic powders includes the step of
providing the net metallic composition as a nickel-base superalloy, and wherein the step of heat treating includes the step of
heat treating the net metallic composition to produce more than about 30 volume percent gamma prime phase.

5. The method of claim 1, wherein the step of providing the mass of metallic powders includes the step of
providing the net metallic composition as a nickel-base superalloy, and wherein the step of heat treating includes the step of
heat treating the net metallic composition to produce more than about 40 volume percent gamma prime phase.

6. The method of claim 1, wherein the step of providing the mass of metallic powders includes the step of
providing the net metallic composition as an intermetallic alloy.

7. The method of claim 1, wherein the step of providing the mass of metallic powders includes the step of
providing the net metallic composition as a titanium-aluminide intermetallic alloy.

8. The method of claim 1, wherein the step of providing includes the step of
providing the mass of metallic powders having a nominal sheet composition in atomic percent of from about 45 to about 49 percent aluminum and from about 48 to about 50.5 percent titanium, with the balance of other alloying and impurity elements.

9. The method of claim 1, wherein the step of providing includes the step of
providing nonmetallic particles mixed with the metallic powders.

10. The method of claim 1, wherein the step of mixing includes the step of
mixing the metallic powders and the temporary thermoplastic binder at a mixing temperature above the thermoplastic temperature of the thermoplastic binder.

11. The method of claim 1, wherein the step of consolidating includes the step of
sintering the injection-molded sheet precursor.

12. The method of claim 1, wherein the step of consolidating includes the step of
hot isostatic pressing the injection-molded sheet precursor.

13. The method of claim 1, including an additional step, after the step of injection molding and before the step of consolidating, of
removing excess thermoplastic binder from the injection-molded sheet precursor.

14. The method of claim 1, wherein the step of consolidating includes the step of
producing the sheet having a length dimension greater than about 100 times a thickness dimension.

15. The method of claim 1, wherein the step of injection molding includes the steps of
providing an injection-molding apparatus including
an injection head with an injection nozzle, and
a movable receiver positioned to receive the injection-moldable mixture flowing from the injection nozzle,
loading the injection-moldable mixture into the injection head, and
forcing the injection-moldable mixture out of the injection nozzle onto the moving surface of the movable receiver, the moving surface moving away from the injection nozzle at the same linear rate as the injection-moldable mixture is forced from the injection nozzle.

16. A method for preparing a sheet of a sheet composition for use as an aircraft skin panel, comprising the steps of
providing a mass of metallic powders, wherein the mass of metallic powders together have the sheet composition that comprises a nickel-base superalloy that may be heat treated to have more than about 30 volume percent of gamma prime phase;
mixing the metallic powders with a temporary thermoplastic binder to form an injection-moldable mixture; thereafter
injection molding the injection-moldable mixture onto a moving surface of a movable receiver at an injection-molding temperature above the thermoplastic temperature of the thermoplastic binder to form an injection-molded aircraft skin panel sheet precursor; thereafter
removing excess thermoplastic binder from the injection-molded aircraft skin panel sheet precursor; thereafter
consolidating the injection-molded aircraft skin panel sheet precursor to a relative density of substantially 100 percent to form the aircraft skin panel sheet of the sheet composition, wherein the temporary thermoplastic binder is removed in the step of consolidating; and thereafter
heat treating the aircraft skin panel sheet.

17. The method of claim 16, wherein the step of providing includes the step of
providing the mass of metallic powders comprising a nickel-base superalloy that may be heat treated to have more than about 40 volume percent of gamma prime phase.

18. The method of claim 16, wherein the step of consolidating includes the steps of
sintering the injection-molded aircraft skin panel sheet precursor, and thereafter
hot isostatic pressing the injection-molded aircraft skin panel sheet precursor.

19. The method of claim 16, wherein the step of consolidating includes the step of producing the aircraft skin panel sheet having a length dimension greater than about 100 times a thickness dimension.

20. The method of claim 16, wherein the step of injection molding includes the steps of
providing an injection-molding apparatus including
an injection head with an injection nozzle, and
a movable receiver positioned to receive the injection-moldable mixture flowing from the injection nozzle,
loading the injection-moldable mixture into the injection head, and
forcing the injection-moldable mixture out of the injection nozzle onto the moving surface of the movable receiver, the moving surface moving away from the injection nozzle at the same linear rate as the injection-moldable mixture is forced from the injection nozzle.

\* \* \* \* \*